US007580544B2

(12) United States Patent
Maeda et al.

(10) Patent No.: US 7,580,544 B2
(45) Date of Patent: Aug. 25, 2009

(54) ADDRESSEE RECOGNIZING APPARATUS

(75) Inventors: Masaya Maeda, Kawasaki (JP); Bunpei Irie, Kawasaki (JP); Hideo Horiuchi, Yokohama (JP); Shunji Ariyoshi, Yokohama (JP); Akihiko Nakao, Kawasaki (JP); Takuma Akagi, Kawasaki (JP); Yasuhiro Aoki, Kawaasaki (JP); Tomoyuki Hamamura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 705 days.

(21) Appl. No.: 11/222,836

(22) Filed: Sep. 12, 2005

(65) Prior Publication Data

US 2006/0215878 A1 Sep. 28, 2006

(30) Foreign Application Priority Data

Mar. 22, 2005 (JP) ............................ 2005-082003

(51) Int. Cl.
*G06K 9/00* (2006.01)

(52) U.S. Cl. ...................................... 382/101; 209/584

(58) Field of Classification Search ................. 382/101, 382/317, 321, 102; 209/584
See application file for complete search history.

(56) References Cited

U.S. PATENT DOCUMENTS

| | | | | |
|---|---|---|---|---|
| 5,518,122 | A * | 5/1996 | Tilles et al. | 209/539 |
| 6,947,574 | B1 * | 9/2005 | Graulich et al. | 382/101 |
| 2001/0031088 | A1 * | 10/2001 | Natori | 382/229 |

FOREIGN PATENT DOCUMENTS

| | | | |
|---|---|---|---|
| DE | 100 34 629 A1 | 3/2001 | |
| DE | 10034629 A1 | 3/2001 | |
| EP | 0938066 A2 | 8/1999 | |
| JP | 10-180192 | 7/1998 | |
| JP | 11-235554 | 8/1999 | |
| WO | WO 00/10113 A1 | 2/2000 | |
| WO | WO 03/004178 A1 | 1/2003 | |

OTHER PUBLICATIONS

European Search Report dated Sep. 7, 2006 for Appln. No. 05019235.0-2307.

* cited by examiner

*Primary Examiner*—Aaron W Carter
(74) *Attorney, Agent, or Firm*—Pillsbury Winthrop Shaw Pittman, LLP

(57) ABSTRACT

An addressee recognizing apparatus recognizes the addressee of matter to be delivered. A database stores a description format including at least a described position, the number of character lines, and the length of each character line in a sender area on the matter to be delivered. When a scanner obtains an image, a plurality of addressee candidate areas are obtained from the image. The apparatus determines whether the description format for each of the extracted candidates matches the description format for the sender area stored in the database. If the description format for the candidate is determined to match the description format for the sender area, the candidate is prohibited from being recognized as the addressee area.

6 Claims, 14 Drawing Sheets

F I G. 1 9
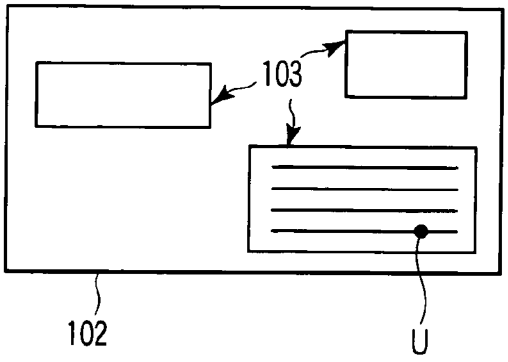
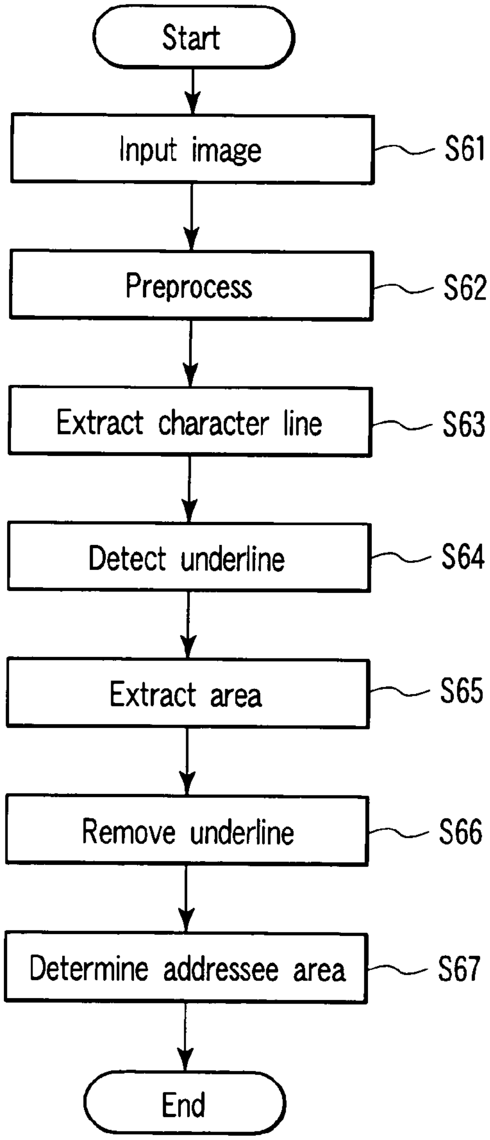
F I G. 2 0

ADDRESSEE RECOGNIZING APPARATUS

CROSS-REFERENCE TO RELATED APPLICATIONS

This application is based upon and claims the benefit of priority from prior Japanese Patent Application No. 2005-082003, filed Mar. 22, 2005, the entire contents of which are incorporated herein by reference.

BACKGROUND OF THE INVENTION

1. Field of the Invention

The present invention relates to an addressee recognizing apparatus that recognizes the addressee of matter to be delivered.

2. Description of the Related Art

When recognizing the addressee of matter to be delivered (a letter or the like), a conventional addressee recognizing apparatus may mistake information in a sender area for an addressee because the information in the sender area may match information in an address database. Thus, it is desirable to present a technique for preventing such erroneous recognition.

For example, Jpn. Pat. Appln. KOKAI Publication No. 10-180192 (paragraph 0037 and the like) (referred to as Document 1 below) discloses a technique in which information on the address of a sender and on the coordinate position of the address area is pre-stored in a table and in which the system determines whether the information in the table matches the result of recognition of the address of the addressee of the postal matter and the position on the postal matter where the address is described so that if the information matches the result of the recognition, this position is considered to be a sender area.

Further, Jpn. Pat. Appln. KOKAI Publication No. 11-235554 (paragraph 0047 and the like) (referred to as Document 2 below) discloses a technique in which if an address candidate is present both inside and outside a cellophane window (or seal), the candidate present outside the cellophane window is considered to be the address of the sender.

However, with the determination based simply on information on the coordinate position of the sender area as disclosed in Document 1, it is difficult to improve the accuracy with which the sender area is recognized. It is thus difficult to achieve accurate address recognition.

On the other hand, postal matter without a cellophane window or the like cannot be flexibly dealt with by the method of utilizing a cellophane window or the like as disclosed in Document 2. This makes it difficult to achieve accurate address recognition.

Under the circumstances, it is desired to provide an addressee recognizing apparatus which can effectively prevent the sender area from being erroneously recognized as an addressee, thus accomplishing accurate address recognition.

BRIEF SUMMARY OF THE INVENTION

According to one aspect of the present invention, there is provided an addressee recognizing apparatus for recognizing an addressee of matter to be delivered, comprising a storage unit which stores a description format including at least a described position, the number of character lines, and the length of each character line in a sender area on the matter to be delivered; a reading unit which reads an image from a surface of the matter to be delivered; an extracting unit which extracts a plurality of candidates for an addressee area from the image read by the reading unit; an addressee determining unit which determines the addressee by sequentially recognizing the candidates extracted by the extracting unit; a determining unit which determines whether or not a description format for each of the candidates extracted by the extracting unit matches a description format for the sender area stored in the storage unit; and a prohibiting process unit which prohibits the candidate from being recognized as the addressee area if the determining unit determines that the description format for the candidate matches the description format for the sender area.

According to another aspect of the present invention, there is provided an addressee recognizing apparatus for recognizing an addressee of matter to be delivered, comprising a storage unit which stores a controlled district controlled by a facility in which the addressee recognizing apparatus is operated; a reading unit which reads an image from a surface of the matter to be delivered; an extracting unit which extracts a plurality of candidates for an addressee area from the image read by the reading unit; an addressee determining unit which determines the addressee by sequentially recognizing the candidates extracted by the extracting unit; a determining unit which determines whether or not an address described in each of the candidates extracted by the extracting unit is included in the controlled district stored in the storage unit; and a processing unit which prohibits the candidate from being recognized as the addressee area or permits the candidate to be recognized as the addressee area according to the determination by the determining unit.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 19 is a diagram showing that an address described position in an address area included in a plurality of candidate areas is underlined; and FIG. 20 is a flowchart showing an operation based on a fourth determining technique.

DETAILED DESCRIPTION OF THE INVENTION

Embodiments of the present invention will be described below with reference to the drawings.

Figure 1:
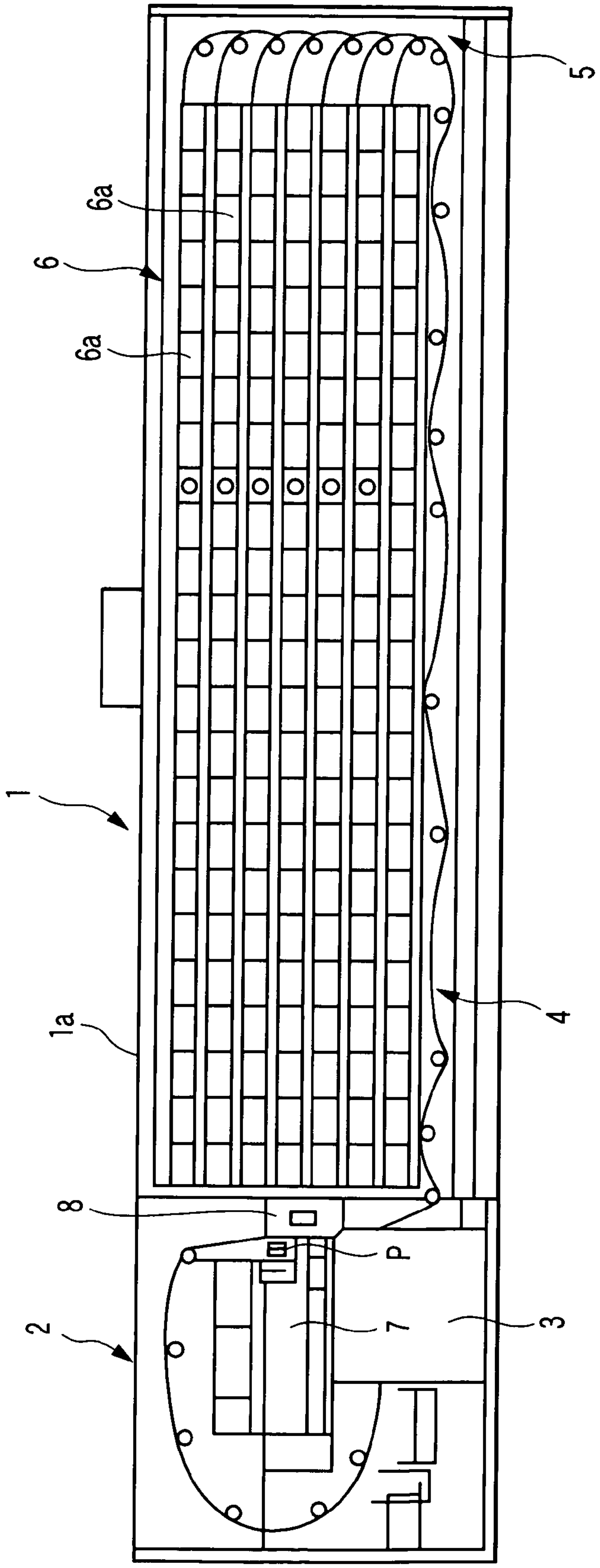
FIG. 1 is a diagram showing the appearance of a classifier according to an embodiment of the present invention.
Figure 2:
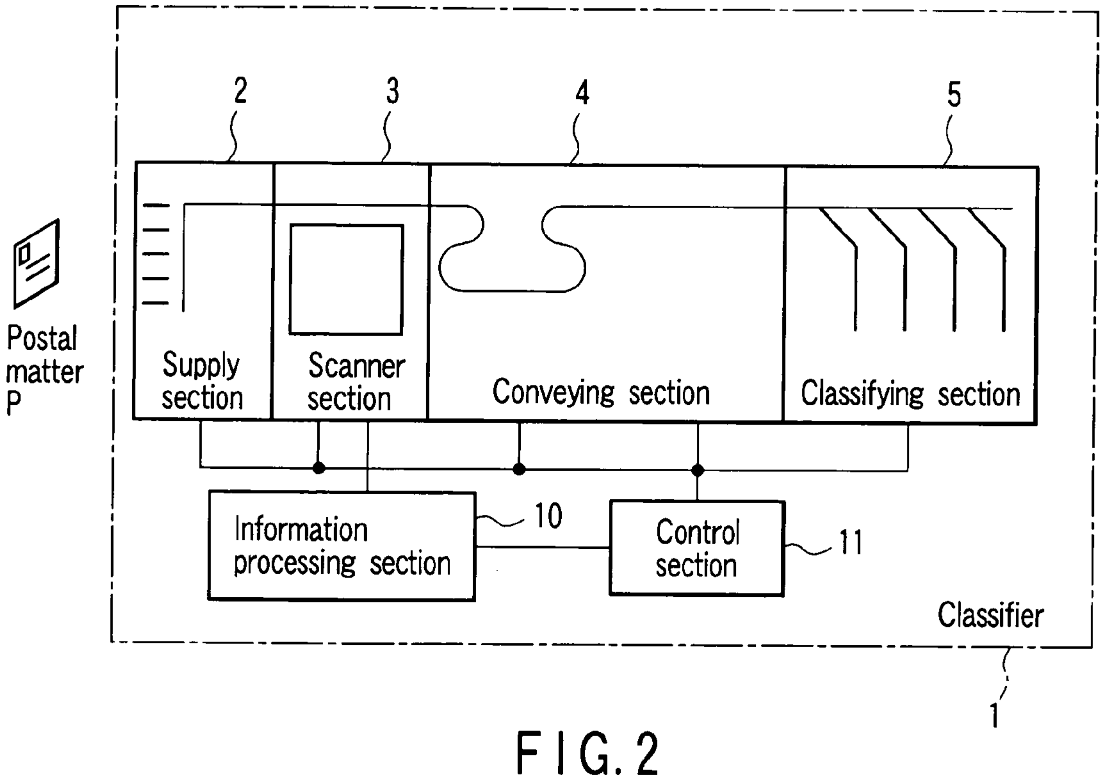
FIG. 2 is a diagram schematically showing the configuration of the classifier.

FIG. 1 is a diagram showing the appearance of a classifier 1 according to an embodiment of the present invention. FIG. 2 is a diagram schematically showing the configuration of the classifier 1. The classifier 1 has a classifier main body 1*a* shaped like a large box. The classifier 1 reads information on postal matter P to recognize an addressee area on the basis of the read content. Then, on the basis of the result of the recognition, the classifier 1 classifies the postal matter P into the corresponding destination.

The classifier main body 1*a* is provided with a supply section 2, a scanner section (reading means) 3, a conveying section 4, a classifying section 5, and a housing section 6. The postal matter P from the supply section 2 is conveyed on a conveying route; the postal matter P passes sequentially through the conveying section 4 and the classifying section 5 to the housing section 6.

The supply section 2 has a placement table 7 on which the postal matter P is placed and a pickup section 8 which picks up the postal matter P from the placement table piece by piece and which then feeds it to the conveying route. The scanner section 3 optically reads the entire image of each piece of the postal matter P conveyed on the conveying route to generate image information. The conveying section 4 conveys the postal matter P having passed through the scanner section 3, to the classifying section 5. The housing section 6 has a large number of housing pockets 6*a* in which classified pieces of the postal matter P are housed. The classifying section 5 diverts each piece of the postal matter P fed by the conveying section 4, to one of the housing pockets 6*a*, etc., on the basis of the result of recognition of the image information from the scanner section 3 as described below.

The scanner section 3 is reading means for optically scanning the postal matter P to execute a photoelectric conversion to read information from the sheet as a pattern signal. The scanner section 3 includes, for example, a light source that irradiates the postal matter with light and a self-scanning CCD image sensor that receives and converts reflected light into an electric signal. An output from the scanner section 3 is supplied to the information processing section 10. The information processing section 10 constitutes an addressee recognizing device together with the scanner section 3; the addressee recognizing device recognizes addressees.

In the classifier 1, a control section 11 connects to the supply section 2, the scanner section 3, the conveying section 4, the classifying section 5, and the information processing section 10. The control section 11 controls the operation of the whole classifier 1. For example, the control section 11 uses a classification specification table stored in a memory (not shown) to read classification specification data corresponding to the result of recognition (or determination) by the information processing section 10. The control section 11 then causes the postal matter P to be conveyed to one of the housing pockets 6*a*, etc., which corresponds to the read classification specification data (the address of this housing pocket 6*a*, etc.).

Moreover, the control section 11 controls the whole conveying system by using a driver (not shown) to drive a conveying mechanism section (not shown).

Figure 3:
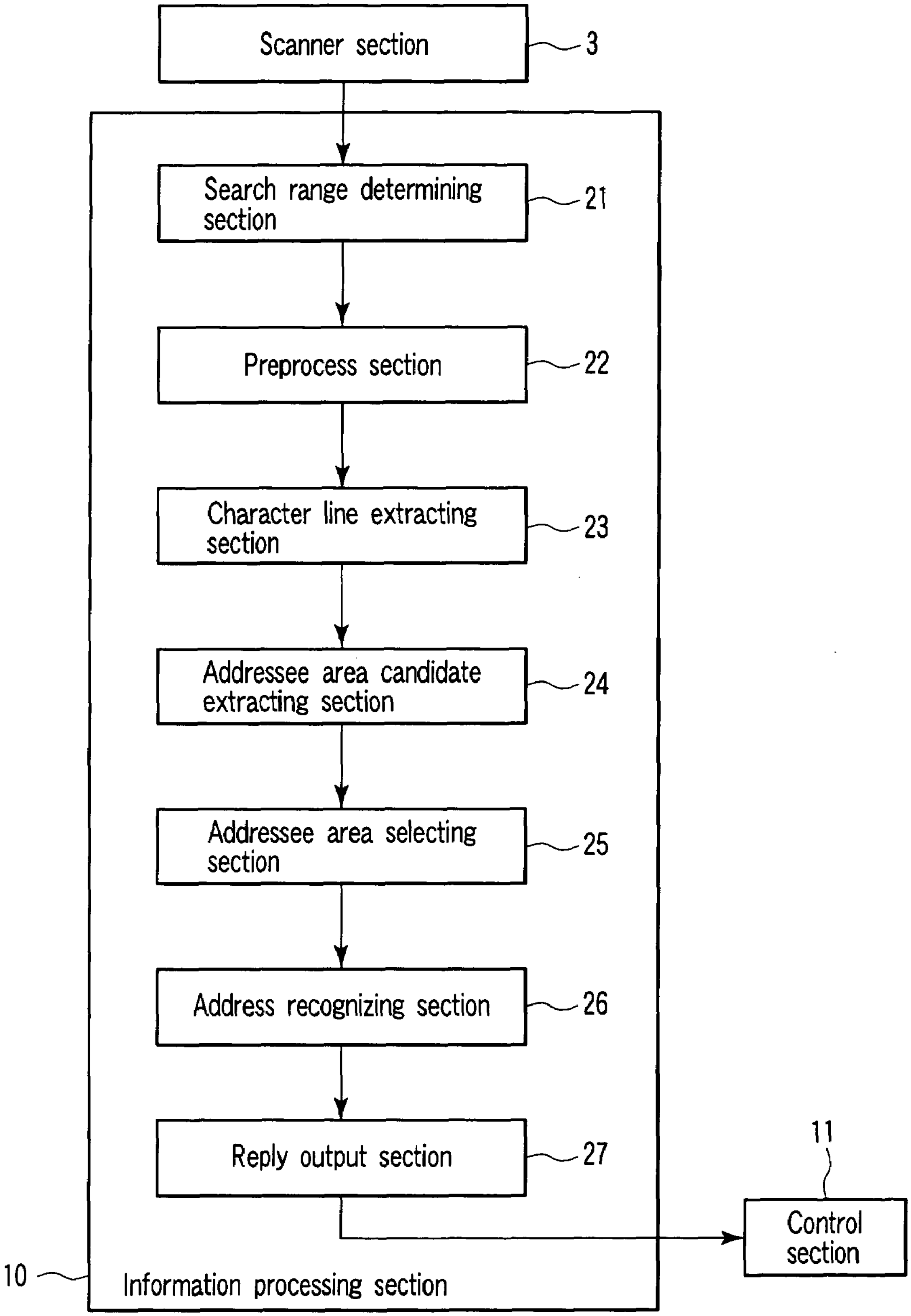
FIG. 3 is a block diagram showing the configuration of an information processing section shown in FIG. 2.
Figure 4:
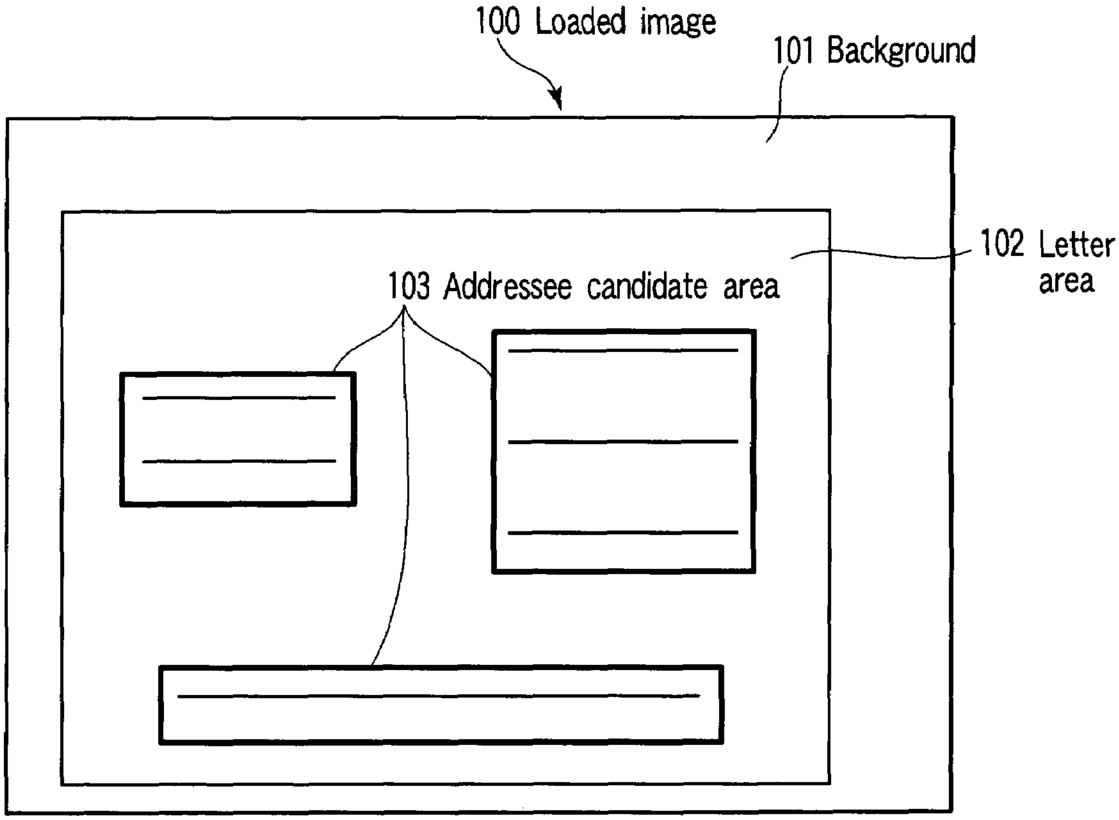
FIG. 4 is a diagram showing various areas included in an image of postal matter read by a scanner section shown in FIG. 2.

FIG. 3 is a block diagram showing the configuration of the information processing section 10, shown in FIG. 2. FIG. 4 is a diagram showing various areas included in an image of the postal matter P read by the scanner section 3, shown in FIG. 2.

As shown in FIG. 3, the information processing section 10 includes a search range determining section 21, a preprocess section 22, a character line extracting section 23, an addressee candidate extracting section (extracting means) 24, an addressee rear selecting section 25, an address recognizing section 26, and a reply output section 27.

The search range determining section 21 determines the search range of an image read by the scanner section 3, the range including a recognition target. For example, the search range determining section 21 determines a postal matter area 102 in a loaded image 100 shown in FIG. 4 to be the search range, the postal matter area 102 being separable from a background 101.

The preprocess section 22 cuts off the image within the search range determined by the search range determining section 21. The preprocess section 22 then converts the cutoff image into a binary image and executes a labeling process so that a joining component for black pixels constitutes a mass (referred to as a label below). If the length of both sides of a circumscribed rectangle for the label obtained is smaller than a certain threshold, that label is considered to be noise and removed.

The character line extracting section 23 extracts a character line that is an address recognition target. For example, the character line extracting section 23 extracts one of the labels obtained by the preprocess section 22 which meets conditions based on information the size and number of characters which are pre-specified for the character recognition target.

The addressee area candidate extracting section 24 extracts a candidate for an addressee area from a plurality of rows extracted by the character line extracting section 23, using information on the positional relationship among the rows, the length of each line, and the like. For example, several addressee candidate areas 103 are detected as shown in FIG. 4. Since the extracted candidates may include an address area, none of the extracted candidates is determined to be an addressee area at this stage.

The address area selecting section 25 gives reading priorities to the candidates for the addressee area obtained by the addressee area candidate extracting section 24 taking into account information on the position of each candidate area with respect to the postal matter P. The address area selecting section 25 selects the address area to be subjected to address recognition in order of increasing priority. However, when the character recognition is used in giving priorities, the addressee area selecting section 25 makes selection after the address recognizing section 26, described below, has executed character recognition. The addressee area selecting section 25 will be described later in detail.

The address recognizing section 26 recognizes the characters described in the area of the addressee area candidate selected by the addressee area selecting section 25 to, for example, have the highest priority. The address recognizing section 26 further checks the word containing the characters against the addresses registered in the address database prepared, to identify the address of the postal matter P. A well-known method may be used to recognize characters. In this case, if the address shown by the word in that area is not registered in the address database, then for example, a recognizing process is executed on the addressee area candidate with the next highest priority. Of course, this repeated operation can be suspended on the basis of some determination criterion.

The reply output section 27 outputs the result of the address recognition provided by the address recognizing section 26. The output address recognition result is sent to the control section 11. If no address recognition result is obtained, a reject process is executed on the postal matter P.

Addressee determining means includes the addressee area selecting section 25, the address recognizing section 26, and the reply output section 27.

Figure 5:
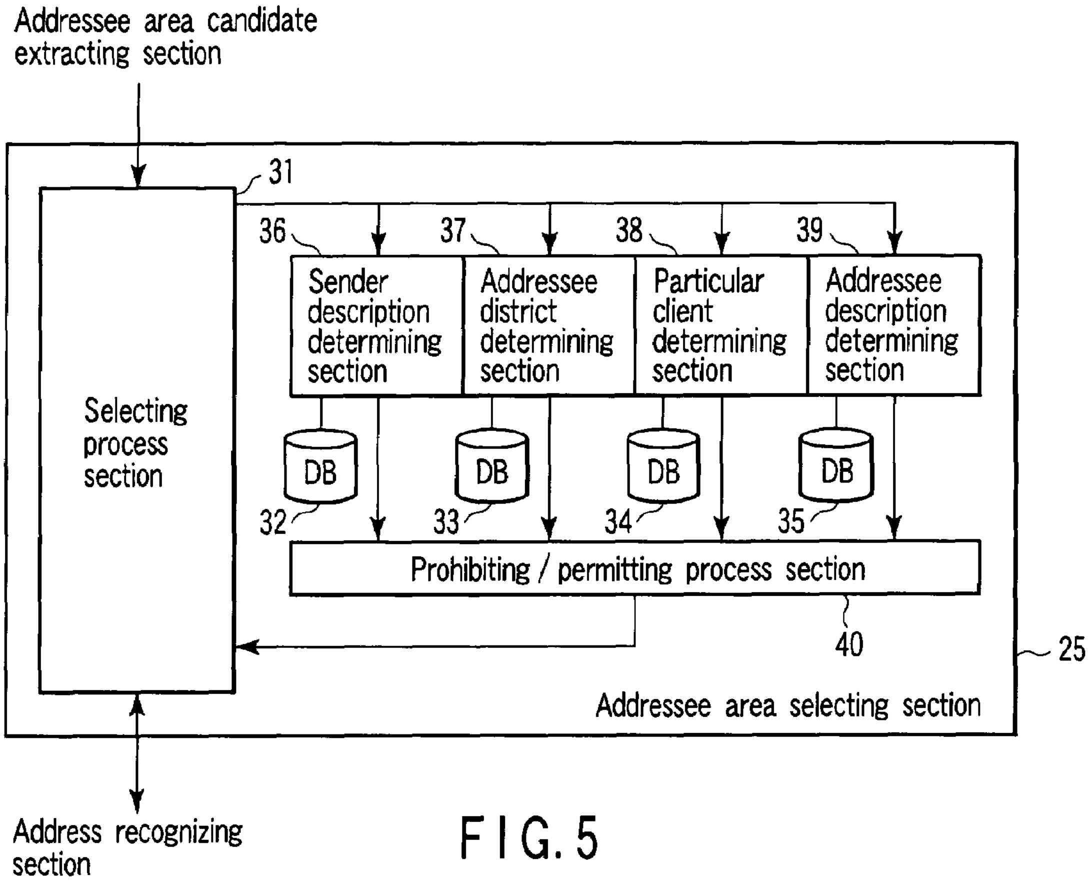
FIG. 5 is a block diagram showing the configuration of an addressee area selecting section shown in FIG. 3.
Figure 6:
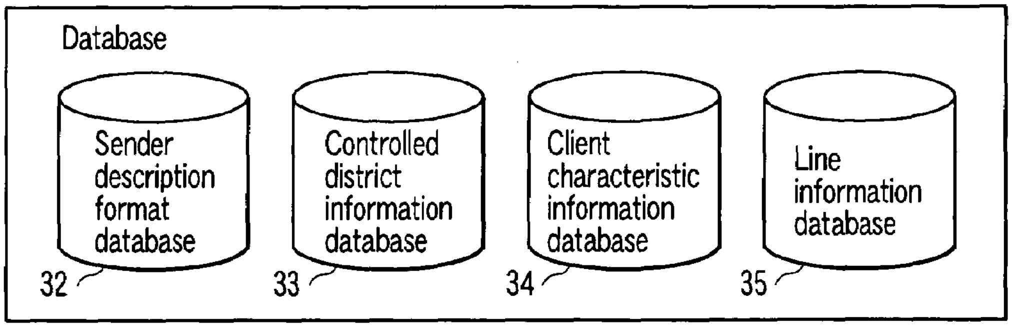
FIG. 6 is a diagram showing the details of various databases shown in FIG. 5.

FIG. 5 is a block diagram showing the configuration of the addressee area selecting section 25. FIG. 6 is a diagram showing the details of various databases shown in FIG. 5.

As shown in FIG. 5, the addressee area selecting section 25 includes a selecting process section 31, a sender description format database (storage means) 32, a controlled district information database (storage means) 33, a client characteristic information database (storage means) 34, a line information database (storage means) 35, a sender description determining section (determining means) 36, an addressee district determining section (determining means) 37, a particular client determining section (determining means) 38, an addressee description determining section (determining means) 39, and a prohibiting/permitting process section (prohibiting/permitting means) 40.

The selecting process section 31 executes the above selecting process. The selecting process section 31 gives reading priorities and selects candidates for the addressee area to be subjected to address recognition. The selecting process section 31 has its selecting process controlled by the prohibiting/permitting process section 40.

The sender description format database 32 stores information indicative of a sender description format for a sender area on the postal matter P. This information includes the position of the sender area on the postal matter P as well as the number of character rows in the sender area, the length of the character line, and the arrangement order of various words in the sender area. The sender description format may be a common description format for the sender area or a description format corresponding to a particular sender (for example, a large-volume client).

The controlled district information database 33 stores information indicative of districts controlled by a facility in which the addressee recognizing apparatus is operated.

The client characteristic information database 34 stores, as information indicative of the characteristics of the particular senders (for example, large-volume clients), client characteristic information including words or graphics such as trade marks or logos which indicate particular clients and the history of past determinations of area coordinate positions. The information may include the position of the sender area on the surface of the matter to be delivered, which position is unique to that client.

The line information database 35 stores line information characteristic of the addressee area (for example, information indicative of a plurality of straight lines or underlines meeting predetermined conditions).

The sender description section 36 determines whether or not the description format for a target candidate matches that for the sender area, by reference to information pre-stored in the sender description format database 32.

The addressee district determining section 37 determines whether or not the address described in the target candidate belongs to in the controlled district, by reference to information pre-stored in the controlled district information database 33. This determination uses the result of the address recognition by the address recognizing section 26.

The particular client determining section 38 determines whether or not the description in the target candidate matches the client characteristic information, by reference to information pre-stored in the client characteristic information database 34.

The address description determining section 39 determines whether or not the description in the target candidate contains the line information, by reference to information pre-stored in the line information database 35.

Instead of all the four determining sections 36 to 39, at least one or two of them may be provided. Similarly, instead of all the four databases 32 to 35, at least one or two of them may be provided.

The prohibiting/permitting process section 40 prohibits the selecting processing section 31 from determining the target candidate to be an addressee area or permits the selecting process section 31 to make this determination, depending on the determination by at least one of the determining sections 36 to 39. For example, if the determination indicates that the target candidate corresponds to the sender area, that candidate is prohibited from being recognized as the addressee area. The prohibiting/permitting process section 40 can preset which of the determining sections 36 to 39 is to be used and what weights are to be applied to individual determinations (or what scoring is to be used).

Now, with reference to the flowchart in FIG. 7, description will be given of an example of a basic operation according to the present embodiment.

The postal matter P is fed into the scanner section 3 (step S101). Then, an image is loaded into the scanner section 3 (step S102).

Then, the search range determining section 21 determines an image search range containing a recognition target. The preprocess section 22 executes a labeling process corresponding to a preprocess (step S103). Moreover, the character line extracting section 23 extracts a character line. The addressee area candidate extracting section 24 extracts several candidates for the addressee area (step S104).

Then, the addressee area selecting section 25 gives reading priorities to the candidates and sequentially selects the candidates in order of increasing priority (step S105). The description in the selected candidate has its format and position analyzed (step S106). With reference to a predetermined database (for example, a database for sender registered information including words or marks representative of the characteristics of particular clients as senders), a score indicative of similarity or the degree of recognition is calculated as required to determine whether or not the candidate is registered (step S107).

In this case, if the candidate is determined to be registered (YES in step S107), it does not correspond to the addressee area, so that address recognition is prohibited. Then, if there is a candidate with the next highest priority (YES in step S108), the process starting from step S105 is repeatedly executed on that candidate. If there is no candidate with the next highest priority (NO in step S108), the system considers that there is no candidate corresponding to the addressee area. The reply section 27 outputs a result indicating that a reject process is to be executed (step S109). The control section 11 then feeds the postal matter P to a reject classification pocket (step S110). Then, the process starting from step S101 is executed on the next postal matter.

On the other hand, if the candidate is determined to be unregistered (NO in step S107), it may correspond to the addressee area, so that address recognition is permitted to be executed. Then, the address recognizing section 26 executes address recognition by checking the address database (step S111).

Then, the address recognizing section 26 determines whether or not an address recognition result corresponding to the addressee has been obtained (step S112). If no address recognition result has been obtained (NO in step S112), the process advances to step S108. On the other hand, if an address recognition result has been obtained (YES in step S112), it is output by the output section 27 (step S113). The control section 11 feeds the postal matter P to the corresponding addressee classification pocket (step S114). Then, the process starting from step S101 is executed on the next postal matter.

Figure 7:
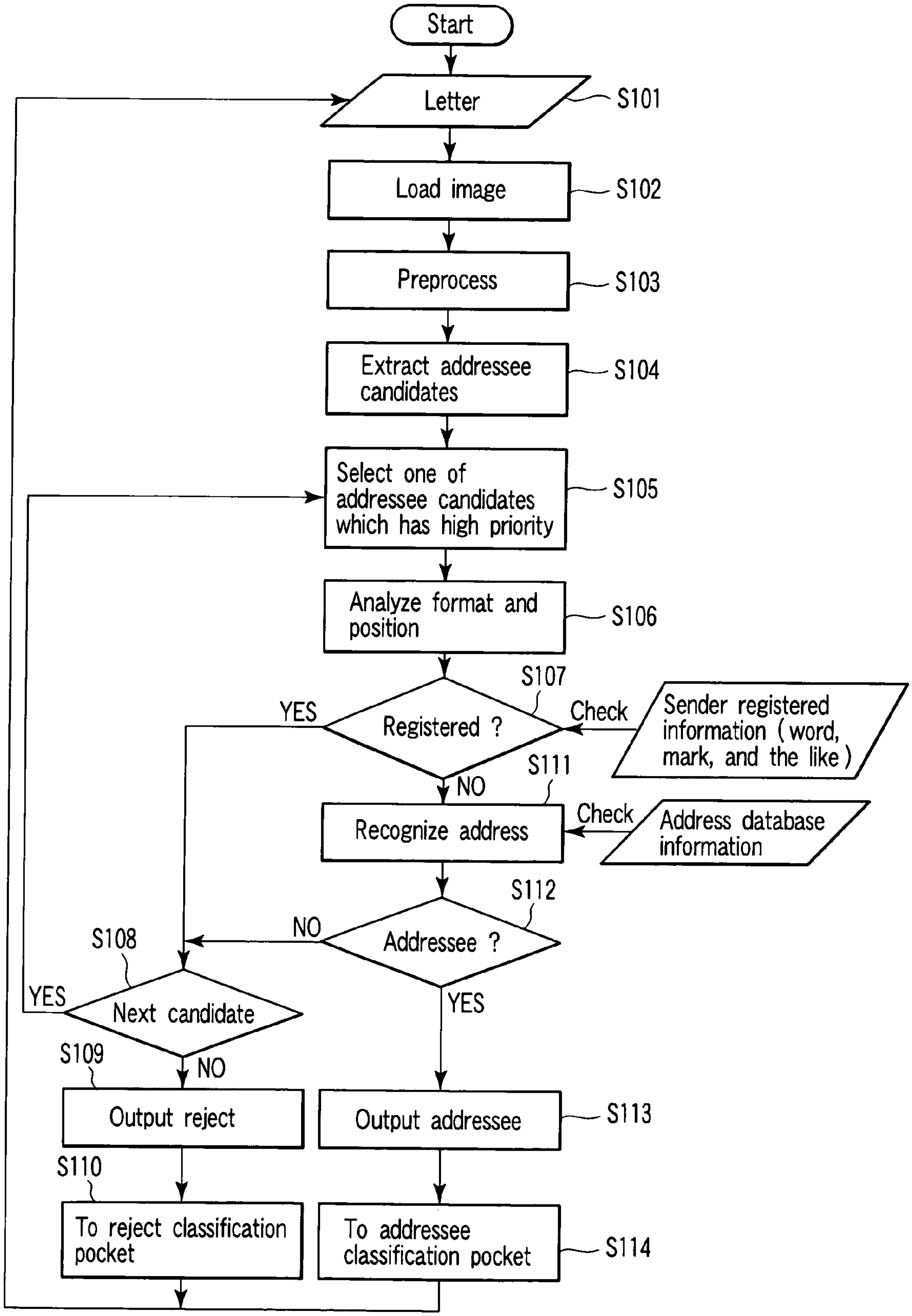
FIG. 7 is a flowchart showing an example of a basic operation according to the present embodiment.

In FIG. 7, the system checks the database for sender registered information to determine whether or not each candidate corresponds to the sender area (or addressee area). However, the determining technique is not limited to this. Various determining techniques will be described below.

<First Determining Technique>

First, the first determining technique will be described with reference to FIGS. 8 to 12. Other figures (FIG. 5 and the like) will be referred to as required. The determination is made using particularly the sender description format database 32 and the sender description determining section 36, shown in FIGS. 5 and 6, previously described.

As previously described, the sender description determining section 36 determines whether or not the description format for a target candidate matches that for the sender area, by reference to the information pre-stored in the sender description format database 32 (information indicative of the sender description format for the sender area on the postal matter P). Further, the prohibiting/permitting process section 40 prohibits that candidate from being recognized as the addressee area, if the description format has been determined to match that for the sender area.

For example, the arrangement of the words constituting the description in the sender area is different from that of the words constituting the description in the addressee area. This difference can be utilized to make the above determination. In this case, information (including the number of character rows, the length of each character line, the relative positional relationship among the words, and the arrangement order of the various words) on the arrangement of the words constituting the description in the sender area is stored in the sender description format database 32. Then, referring to this information makes it possible to determine whether or not the description format for the target candidate matches that for the sender area. By thus excluding, from the addressee recognition targets, the candidate determined to match the description format for the sender area, it is possible to prevent erroneous recognition to efficiently accomplish addressee recognition.

Figure 8:
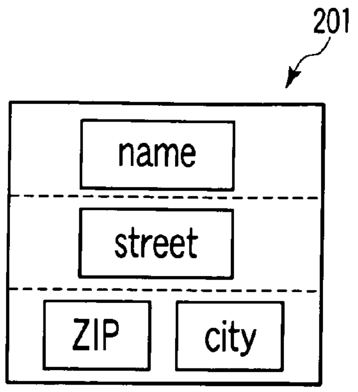
FIG. 8 is a diagram showing an example of a word configuration used in Swedish mail.
Figure 9:
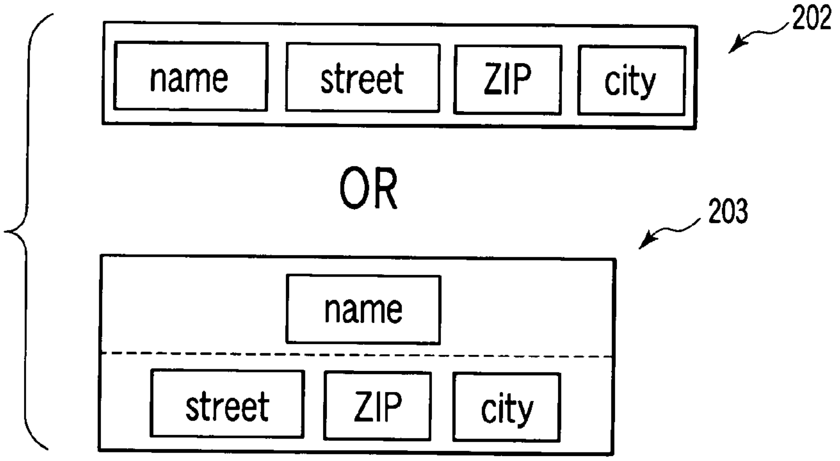
FIG. 9 is a diagram showing another example of a word configuration used in Swedish mail.

Now, description will be given of an example in which the present apparatus is applied to mail operated in Sweden. FIGS. 8 and 9 show several examples of word configurations used in Swedish mail. If the descriptions of the sender and addressee areas both have a word configuration 201 shown in FIG. 8, it is generally difficult to detect the sender area. However, if a word configuration 202 or 203 shown in FIG. 9 is detected, since it is not standard, the area is determined to be the sender area. Thus, the area is excluded from the addressee recognition targets.

Figure 10:
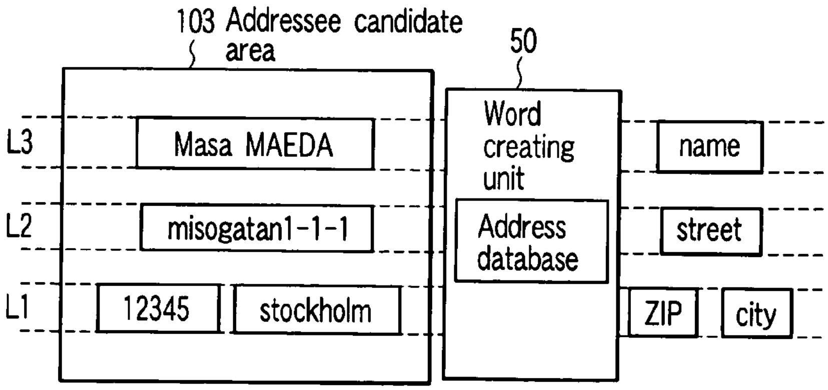
FIG. 10 is a diagram illustrating a word creating unit used to create information indicative of a word configuration on the basis of a description in a candidate area.

FIG. 10 is a diagram illustrating a word creating unit 50 that creates information indicative of a word configuration on the basis of the description in a candidate area. The location of the word creating unit 50 is not particularly limited.

The word creating unit 50, for example, cuts and separates word candidates on the basis of clearance sensing, recognizes characters on the basis of the various databases, and determines words to create two-dimensional information indicative of the configuration or arrangement of words within a candidate area. In the example shown in FIG. 10, a plurality of rows (L3, L2, L1) are detected in the addressee candidate area 103 having the word configuration shown in FIG. 8. A word "Masa MAEDA" corresponding to a name is obtained from the line L3. A word "misogatan" corresponding to a street is obtained from the line L2. "12345" corresponding to a postal code (e.g., ZIP code) and a word "Stockholm" corresponding to a city name are separately obtained from the line 1. The word creating unit 50 may adopt any method provided that it can cut and separate the individual words on the candidate area.

Figure 11:
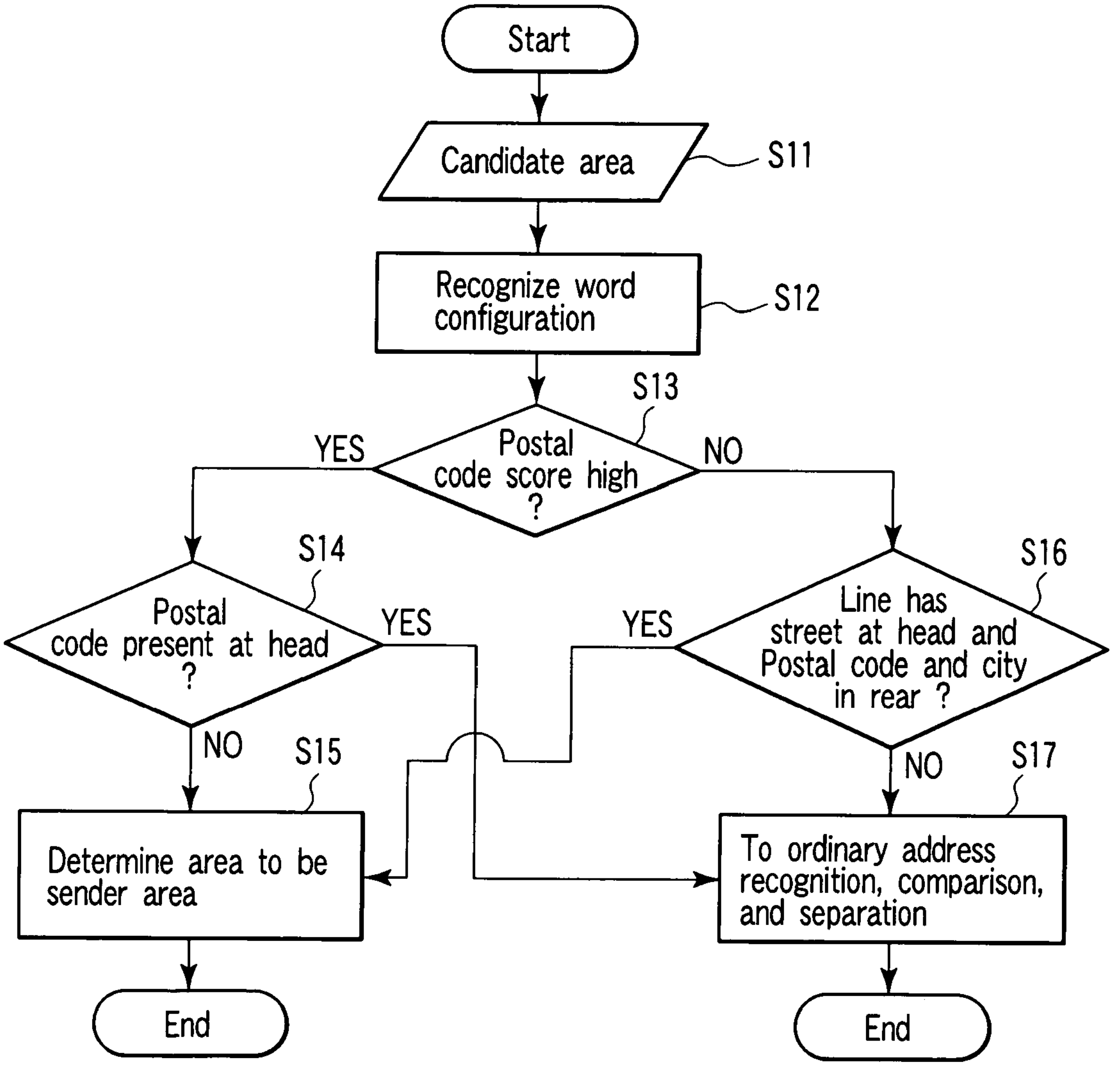
FIG. 11 is a flowchart schematically showing an operation based on a first determining technique.

Now, with reference to the flowchart in FIG. 11, a brief description will be given of an operation based on the first determining technique.

Information on a candidate area is input to the word creating unit 50 (step S11). The word creating unit 50 recognizes the configuration of the words in the candidate area (step S12). Then, the determining section 36 determines whether or not one of the words contained in the candidate area which corresponds to a postal code has a score higher than a threshold (step S13).

If in step S13, the score of the word corresponding to a postal code is higher than the threshold (YES in step S13), the determining section 36 determines whether or not the postal code is located at the head of the line (step S14). If no postal code is present at the head of the line (NO in step S14), the determining section 36 determines that the candidate area is the sender area and should be excluded from the addressee recognition targets (step S15). On the other hand, if a postal code is present at the head of the line (YES in step S14), it is impossible to determine whether the candidate area is the sender or addressee area. Accordingly, the processing is entrusted to an ordinary address recognition algorithm (step S17).

Further, if in step S13, the score of the word corresponding to a postal code is not higher than the threshold (NO in step S13), the determining section 36 determines whether or not the line has a street at its head and a postal code and a city name in its rear (step S14). If a postal code and a city name are present in the rear of the same line (YES in step S16), the determining section 36 determines that the candidate area is the sender area and should be excluded from the addressee recognition targets (step S15). On the other hand, if a postal code and a city name are not present in the rear of the same line (NO in step S16), it is impossible to determine whether the candidate area is the sender or addressee area. Accordingly, the processing is entrusted to an ordinary address recognition algorithm (step S17).

Figure 12:
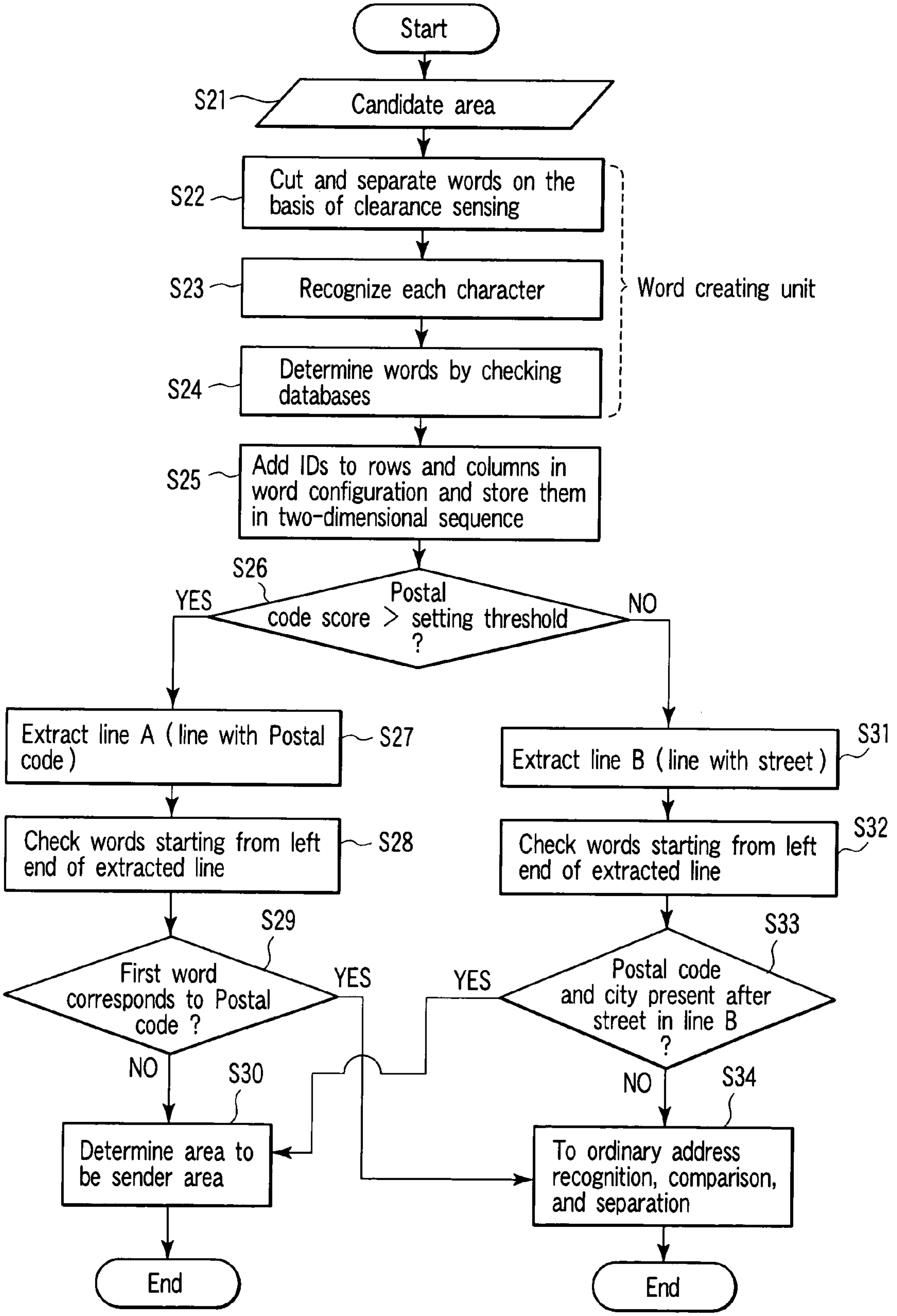
FIG. 12 is a flowchart showing the details of the operation shown in FIG. 11.

Now, with reference to the flowchart in FIG. 12, a detailed description will be given of an operation shown in FIG. 11.

Information on a candidate area is input to the word creating unit 50 (step S21). The word creating unit 50 cuts and separates word candidates on the basis of clearance sensing (step S22). The word creating unit 50 recognizes each of the characters (step S23). Subsequently, the word creating unit 50 determines the words using the address database and the like (step S24) to create two-dimensional information indicative of the configuration or arrangement of the words within the candidate area. Each of the words generated by the word creating unit 50 is provided with ID so as to indicate the ordinal number of the line and the ordinal number of the word in that line. The words are then stored in storage media in the form of a two-dimensional sequence (step S25). The storage media also stores a score indicative of the level of the result of recognition of each word. The score is determined taking into account not only the result of recognition of the word itself but also the position where the word is present, the length of the word, and the like.

If in step S26, the word corresponding to a postal code has a score higher than the threshold (YES in step S26), the determining section 36 examines the arrangement of each word recognized by the word creating unit 50 to extract a line (for example, line A) in which a postal code is present (step S27). Then, the determining section 36 sequentially checks the ID of each word starting from the left end of the extracted line (step S28). The determining section 36 thus determines whether or not the word at the head of the extracted line is a postal code (step S29). If the word at the head of the extracted line is not a postal code (NO in step S29), the determining section 36 determines that determines that the candidate area is the sender area and should be excluded from the addressee recognition targets (step S30). On the other hand, if the word at the head of the extracted line is a postal code (NO in step S29), it is impossible to determine whether the candidate area is the sender or addressee area. Accordingly, the processing is entrusted to an ordinary address recognition algorithm (step S34).

Further, if in step S26, the word corresponding to a postal code has a score not higher than the threshold (NO in step S26), the determining section 36 extracts a line (for example, line B) in which a street is present at its head (step S31). Then, the determining section 36 sequentially checks the ID of each word starting from the left end of the extracted line (step S32). The determining section 36 then determines whether or not a postal code and a city name are present after the street (step S33). If a postal code and a city name are present after the street (YES in step S33), the determining section 36 determines the candidate area is the sender area and should be excluded from the addressee recognition targets (step S30). On the other hand, if neither a postal code nor a city name is present after the street (NO in step S33), it is impossible to determine whether the candidate area is the sender or addressee area. Accordingly, the processing is entrusted to an ordinary address recognition algorithm (step S34).

As described above, the first determining technique can improve the accuracy of the addressee recognizing process by utilizing information on not only the position where the sender area is described in the postal matter P but also the number of character lines in the sender area, the length of each character line, the order of arrangement of the various words within the sender area, and the like.

<Second Determining Technique>

Now, a second determining technique will be described with reference to FIGS. 13 to 17. Other figures (FIG. 5 and the like) will also be referred to. The determination is made using particularly the controlled district information database 33 and addressee district determining section 37, shown in FIGS. 5 and 6, previously described.

As previously described, the controlled district determining section 37 determines whether or not the address described in the target candidate area belongs to the controlled district, by reference to information pre-stored in the controlled district information database 33. On the basis of the determination, the controlled district determining section 37 determines whether or not the candidate area is the addressee or sender area. This determination uses the result of the address recognition by the address recognizing section 26. Further, the prohibiting/permitting process section 40 prohibits the target from being determined to the addressee area or permits the target to be determined to the address area, depending on the determination. The above determining process varies depending on whether the postal matter P is collected mail or arriving mail.

Figure 13:
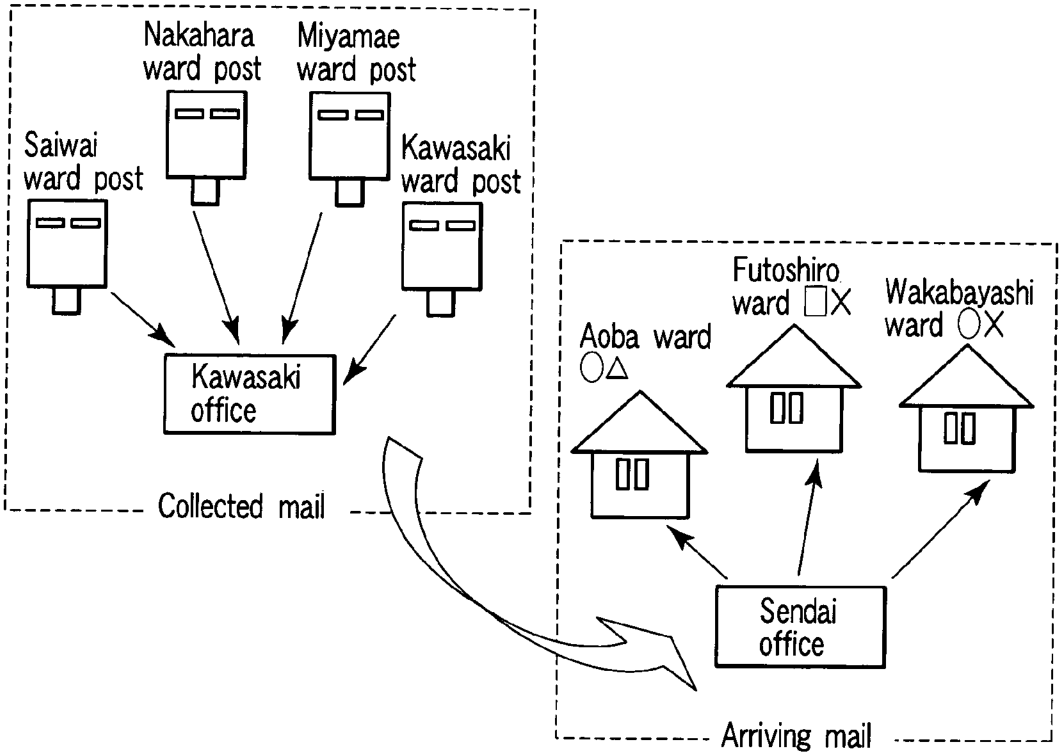
FIG. 13 is a diagram illustrating a difference between collected mail and arriving mail.

FIG. 13 shows the difference between the collected mail and arriving mail. The collected mail is collected at a control office from posts within the controller district. On the other hand, the arriving mail is delivered to an office close to the addressee, by a collecting office that has collected the mail. The arriving mail is delivered to the addressee by personnel.

For example, it is assumed that the recognized address of a candidate area on the postal matter P belongs to the district controlled by the facility in which the addressee recognizing apparatus is operated, whereas the recognized address of another candidate area on the postal matter P does not belong to the district controlled by the facility in which the addressee recognizing apparatus is operated. Then, with the second determining technique determines whether the target area is the sender or addressee area depending on whether the postal matter P is collected or arriving mail.

Figure 14:
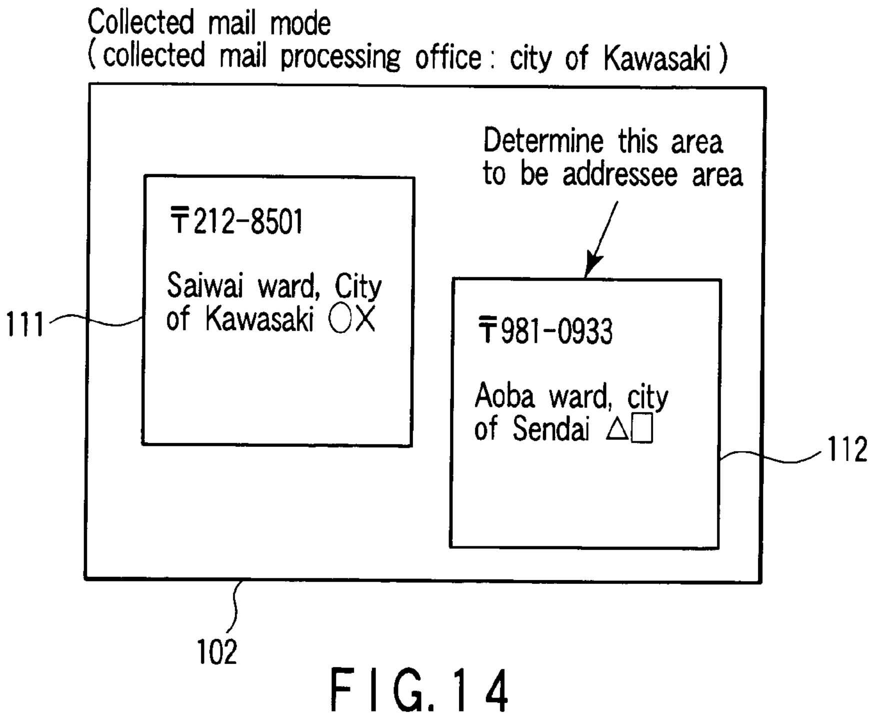
FIG. 14 is a diagram illustrating a determining process executed in a collected mail processing office.

If the postal matter P is collected mail, the addressee recognizing apparatus enters a collected mail mode in which collected mail is processed. In this case, it is assumed that a postal matter area 102 on the postal matter P has, for example, an area 111 in which an address in the city of Kawasaki is described and an area 112 in which an address in the city of Sendai is described and that the addressee recognizing apparatus is provided in the processing office in the city of Kawasaki, as shown in FIG. 14. Then, by checking the controlled district information database 33, the determining section 37 determines that the area 111 in which the address in the city of Kawasaki is described to be the sender area. The determining section 37 then excludes the area 111 from the addressee recognition targets. The determining section 37 then determines that the area 112 in which the address in the city of Sendai is described to be the addressee area.

Figure 15:
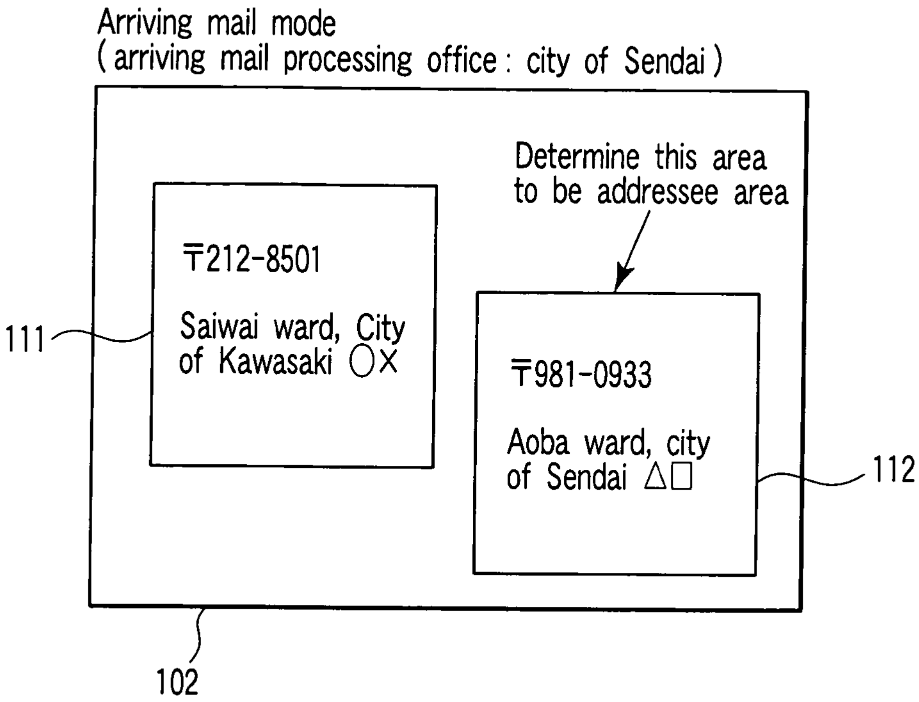
FIG. 15 is a diagram illustrating a determining process executed in an arriving mail processing office.

On the other hand, if the postal matter P is arriving mail, the addressee recognizing apparatus enters an arriving mail mode in which arriving mail is processed. In this case, it is assumed that the postal matter area 102 on the postal matter P has the same areas 111 and 112 as those shown in FIG. 14 and that the addressee recognizing apparatus is provided in the processing office in the city of Sendai, as shown in FIG. 15. Then, by checking the controlled district information database 33, the determining section 37 determines that the area 112 in which the address in the city of Sendai is described to be the addressee area. The determining section 37 then excludes the area 111 in which the address in the city of Kawasaki is described, from the addressee recognition targets.

Figure 16:
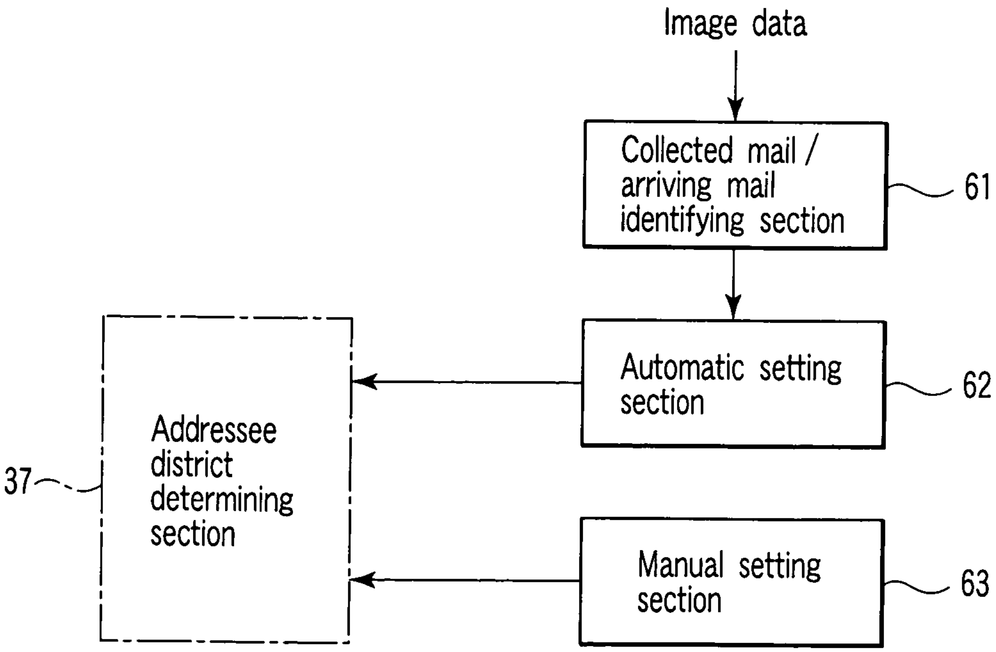
FIG. 16 is a diagram showing an arrangement used to realize mode switching according to the type of postal matter.

FIG. 16 is a diagram showing an arrangement that realizes mode switching according to the type of the postal matter P.

A collected mail/arriving mail identifying section 61 detects, for example, a postmark on the postal matter P to determine whether the postal mark P is collected or arriving mail. An automatic setting section 62 is used to automatically execute mode switching according to the type of the postal matter P. The automatic setting section 62 selects and sets one of the collected and arriving mail modes according to the identification by the collected mail/arriving mail identifying section 61. A manual setting section 63 is used to manually execute mode switching according to the type of the postal matter P. The manual setting section 63 allows manual selection and setting of one of the collected and arriving mail modes according to an operation by the user.

Figure 17:
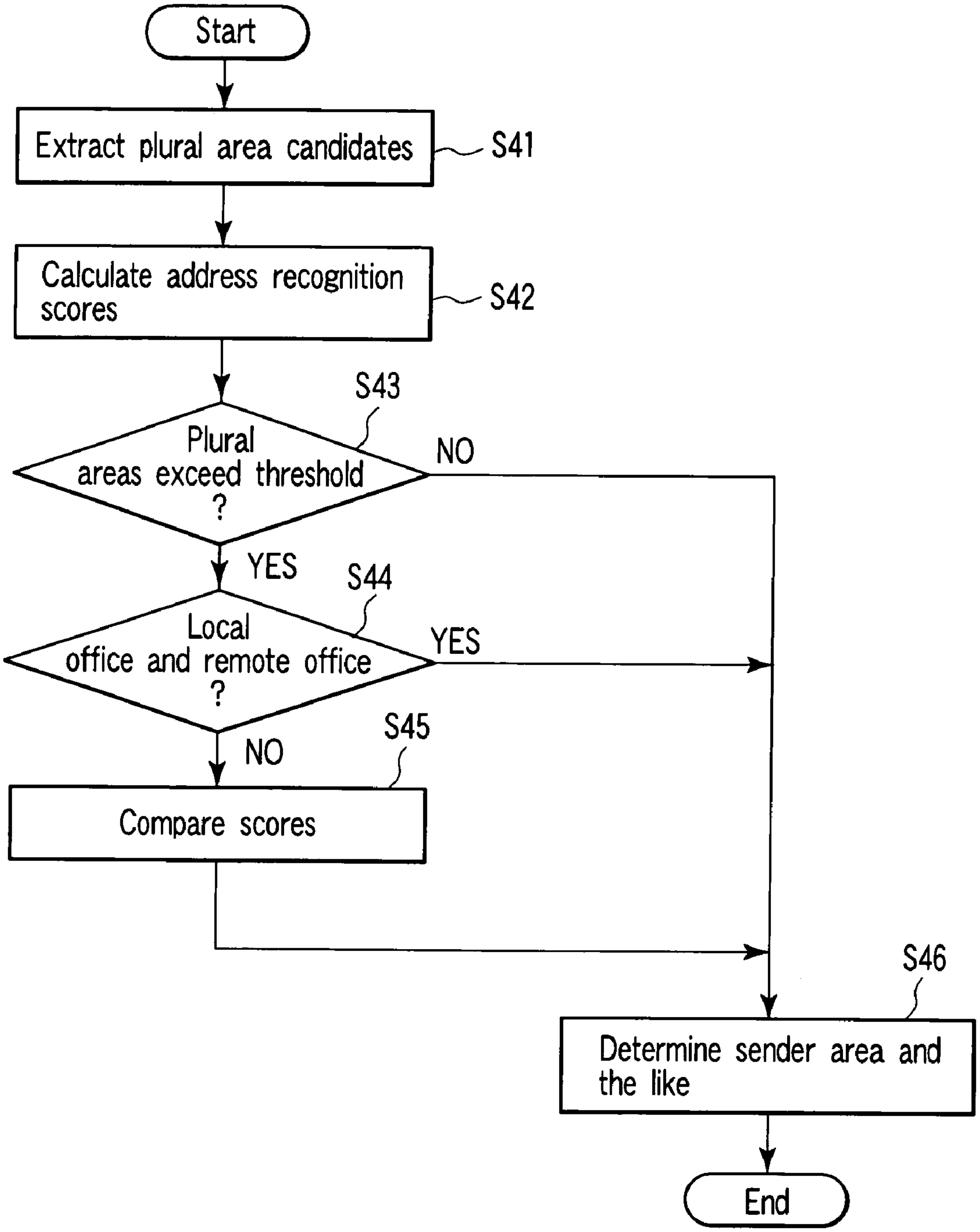
FIG. 17 is a flowchart showing an operation based on a second determining technique.

Now, with reference to FIG. 17, description will be given of an operation based on the second determining technique.

A plurality of candidate areas are extracted (step S41). An address recognition score for each of the character lines contained in each area candidate is calculated (step S42). Then, with reference to the calculated scores of the plurality of area candidates, the system determines whether or not a plurality of areas exceed a threshold used to determine whether the area corresponds to an address (step S43). If only one area exceeds the threshold and is expected to correspond to an address (NO in step S43), the determining section 37 determines whether or not the area is the sender area (or addressee area) and outputs the determination (step S46).

On the other hand, if a plurality of areas exceed the threshold and are expected to correspond to addresses (YES in step S43), the determining section 37 checks the controlled district information database 33 to determine whether each of the areas corresponds to a local district or a remote district (step S44). The subsequent process varies depending on whether the collected or arriving mail mode has been set.

First, description will be given of the case in which the collected mail mode has been set. With the collected mail mode set, i) if there are both an area corresponding to the local district and an area corresponding to a remote district (YES in step S44), the determining section 37 determines that the area corresponding to the local district is the sender area and that the area corresponding to the remote district is the addressee area. The determining section 37 thus outputs the determination (step S46). ii) If all the individual areas correspond to the local district (NO in step S44), the determining section 37 considers that this is local mail and that it is impossible to make determination using the controlled district information database 33. The determining section 37 thus uses the succeeding score comparing section to compare the scores of the areas with one another (step S45). The determining section 37 uses the result of the comparison to determine the sender and addressee areas and then outputs the determination (step S46). iii) If all the individual areas correspond to remote districts (NO in step S44), since this is expected to be mail between remote districts using a preprinted envelope having an addressee and a sender already described and which was mailed while the sender was on a business trip, the determining section 37 considers again that it is impossible to make determination using the controlled district information database 33. The determining section 37 thus uses the score comparing section to compare the scores of the areas with one another (step S45). The determining section 37 then uses the result of the comparison to determine the sender and addressee areas and then outputs the determination (step S46).

Now, description will be given of the case in which the arriving mail mode has been set. With the arriving mail mode set, i) if there are both an area corresponding to the local district and an area corresponding to a remote district (YES in step S44), the determining section 37 determines that the area corresponding to the local district is the addressee area and that the area corresponding to the remote district is the sender area. The determining section 37 thus outputs the determination (step S46). ii) If all the individual areas correspond to remote districts (NO in step S44), the determining section 37 considers that this is a transfer between remote districts (relay) and that it is impossible to make determination using the controlled district information database 33. The determining section 37 thus uses the succeeding score comparing section to compare the scores of the areas with one another (step S45). The determining section 37 uses the result of the comparison to determine the sender and addressee areas and then outputs the determination (step S46). If information on the destination of the arriving mail is known, the transfer may be repeated. Accordingly, a process may be executed which involves adding a code indicative of rejection. iii) If all the individual areas correspond to the local district (NO in step S44), since this is expected to be mail between remote districts using a preprinted envelope having an addressee and a sender already described and which was mailed while the sender was on a business trip, the determining section 37 considers again that it is impossible to make determination using the controlled district information database 33. The determining section 37 thus uses the score comparing section to compare the scores of the areas with one another (step S45). The determining section 37 then uses the result of the comparison to determine the sender and addressee areas and then outputs the determination (step S46).

If overseas postal matter is sent to the local district by arriving mail and a plurality of areas exceed the threshold and are expected to correspond to addresses, then provided that the country code of the destination is known, it is possible to refer to the format of the postal code (the number of alphabets and digits) to check whether or not there is any correlation with any of the numbers in the local district.

As described above, the second determining technique can improve the accuracy of the addressee recognizing process by utilizing information on the district controlled by the facility in which the addressee recognizing apparatus is operated.

<Third Determining Method>

Figure 18:
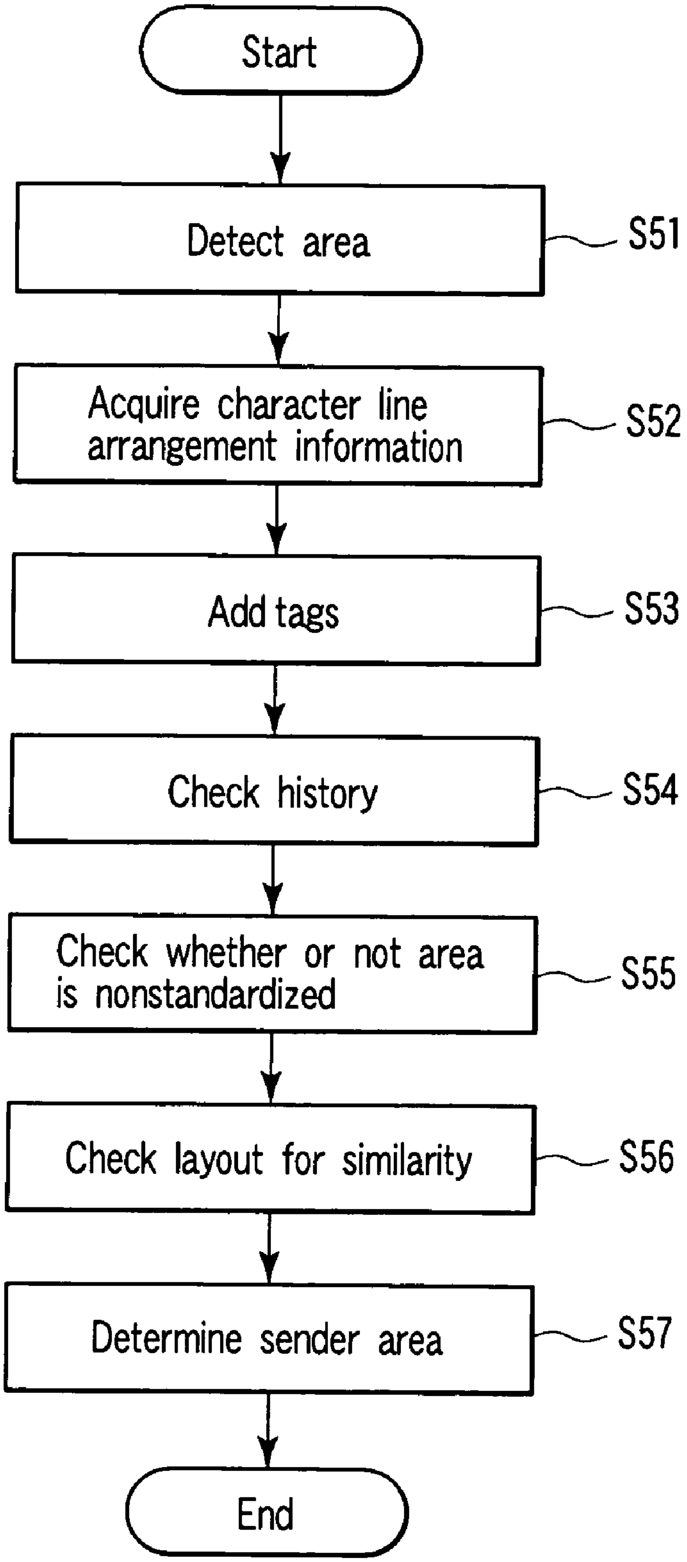
FIG. 18 is a flowchart showing an operation based on a third determining technique.

Now, a third determining technique will be described with reference to FIG. 18. Other figures (FIG. 5 and the like) will also be referred to. The determination is made using particularly the client characteristic information database 34 and particular client determining section 38, shown in FIGS. 5 and 6, previously described.

As previously described, the particular client determining section 38 determines whether or not the description in a target candidate matches the client characteristic information, by reference to client characteristic information (information including words or graphics such as trade marks or logos which indicate particular clients such as large-volume clients and the history of past determinations of area coordinate positions). Further, the prohibiting/permitting process section 40 prohibits the candidate from being recognized as the addressee area, if the particular client determining section 38 determines that the description in the target candidate matches the client characteristic information.

Now, with reference to FIG. 18, description will be given to an operation based on the third determining technique.

A candidate area on the postal matter P is detected (step S51). Positional information (coordinate information or the like) is obtained which is indicative of the positions in that area where the character lines are arranged (step S52). The information obtained includes not only the positional information but also character lines and symbols. Moreover, when a recognizing process is executed within a character line, information indicative of the results of character, word, or symbol recognition (similarity to a dictionary or the degree of recognition) is left as scores. The information is added to the positional information as tag information and stored in the storage media (step S53).

Subsequently, the procedure described below can be used to determine whether or not each candidate area corresponds to the sender area. In this case, it is assumed that postal matter in the same format for a large-volume client is continuously processed.

First, the determining section 38 checks history relating to past several pieces of positional information and past several scores (step S54). Specifically, it is assumed that a plurality of area candidates A and B are present on the target postal matter P, that the scores of the area candidates A and B are defined as Sa and Sb, respectively, and that the information on the coordinates of the areas are Da and Db, respectively. Then, the information used for comparison with the past history is expressed as:

$$\phi(A(Sa,Da),\ B(Sb,Db))$$

On the other hand, the past history (for example, recently frequent information) is expressed as:

$$\phi1(A1(Sa1,Da1),\ B1(Sb1,Db1))\ \ldots$$

$$\phi2(A2(Sa2,Da2),\ B2(Sb2,Db2))\ \ldots$$

When the similarity S (φ, φ1), S (φ, φ2) . . . to each piece of the history is derived, it is found that the character recognition scores and positional information of these areas are almost the same as those in the history and that these areas were determined to the sender area.

Then, the determining section 38 checks whether or not the area candidate is a nonstandardized area that is not the sender area (step S55). The coordinates of an area are generally expressed using a set of the coordinates of a start and end points such as D(x)=(sx, sy, ex, ey). Here, an empirical sender description position probability distribution P(x) is set for the entire surface of the postal matter; the empirical sender description position probability distribution P(x) is pre-stored in the client characteristic information database 34. Deriving the product of the probability distribution P(x) and area coordinates D(x) results in:

$$P(x)D(x)=1 \text{ True (sender area), or}$$

$$P(x)D(x)=0 \text{ False (not sender area)}$$

Thus, the position of the sender area can be determined.

However, this is an example of the simplest case. If for example, a plurality of area coordinates Da(x), Db(x), Dc(x) are obtained, the result is:

$$P(x)(Da(x),Db(x),Dc(x))=(0,1,0)$$

This clearly indicates that the area corresponding to Db(x) is the sender area. However, if a result indicating the sender area is not obtained as in the case of:

$$P(x)(Da(x),Db(x),Dc(x))=(0,0,0)$$

the sender area cannot be identified. Accordingly, the following is output: the result indicating that the sender area cannot be determined or that the postal matter P is to be rejected. Conversely, if a plurality of areas are considered to be the sender area as in the case of:

$$P(x)(Da(x),Db(x),Dc(x))=(1,1,1)$$

the sender area cannot be identified. Accordingly, the following is output: the result indicating that the sender area cannot be determined or that the postal matter P is to be rejected.

Then, the determining section 38 makes determination concerning the similarity of layout parameters for the candidate area (step S56).

The detected candidate area has a word or graphic (referred to as a keyword or the like below) which identifies the sender. A plurality of keywords or the like can be extracted using a conventional method for word extraction in the document area. Specifically, it is assumed that there are a plurality of area candidates A and B, that the labels such as keywords in the area candidates A and B are La and Lb, respectively, and that information on the coordinates of the areas is Da and Db, respectively. Then, the determining section 38 determines whether or not each of the combinations of the elements of A(La, Da) and B(Lb, Db) is similar to the information pre-stored in the client characteristic information database 34. In this case, on the basis of the information registered in the client characteristic information database 34, for example, the following results are obtained.

$$(La \times Da \times Db) \rightarrow \text{True (sender area)}$$

$$(Lc \times Da' \times De) \rightarrow \text{True (sender area)}$$

$$(La \times Da' \times Db) \rightarrow \text{False (not sender area)}$$

Thus, on the basis of the results of the checks in steps S54 to S56, the sender area is determined with the determination output (step S57).

As described above, the third determining technique can improve the accuracy of the addressee recognizing process by utilizing client characteristic information including words or graphics such as trade marks or logos which indicate particular clients and the history of past determinations of area coordinate positions.

<Fourth Determining Method>

Now, a fourth determining technique will be described with reference to FIGS. 19 and 20. Other figures (FIG. 5 and the like) will also be referred to. The determination is made using particularly the line information database 35 and addressee description determining section 39, shown in FIGS. 5 and 6, previously described.

As previously described, the addressee description determining section 39 determines whether or not the description in the target candidate contains the line information, by reference to information pre-stored in the line information database 35. Further, the prohibiting/permitting process section 40 permits the candidate to be recognized as the addressee area, if the description in the target candidate contains the line information.

FIG. 19 is a diagram showing that an address described position in the addressee area of a plurality of candidate areas 103 is underlined. In a preprinted postcard or the like, such an underline is preprinted as a dotted or solid line. Even in other postal matter, a portion in which a country name or a city name is written is often manually underlined in order to emphasize the addressee. The fourth determining technique detects such an underline to determine the addressee area.

Now, with reference to FIG. 20, description will be given of an operation based on the fourth determining technique.

An image of postal matter is obtained which has been picked up using the scanner (step S61). The preprocess section 22 executes a preprocess (step S62). If the postal matter P is preprinted as described above, the preprocess leaves a character image and an underline image active.

Then, the character line extracting section 23 extracts information on a character line from a character candidate label (step S63). If an underline is present, it is detected (step S64). The corresponding area is extracted (step S65). Then, the underline is removed from the area (step S66). In this case, the underline is detected and removed using Hough transformation and contour tracking information.

A plurality of area candidates are generated using the character line from which the underline has been removed. In this case, information indicating whether the underline has been removed is stored in association with information on the character line constituting the area candidate generated. After the plurality of character areas are generated, the determining section 38 refers to the information indicating whether or not the underline has been removed. If the information indicates that the underline has been removed, the determining section 38 determines that area to be the addressee area regardless of the result of the character recognition (step S67).

A manually drawn underline can similarly be detected and removed. If a manually drawn underline is detected in the area candidate, this area is determined to be the addressee area as in the case of the printed underline. Now, description will be given of the process executed on a manually drawn underline. As previously described, the portion in which, for example, a country name and a chief city name are written is often manually underlined in order to emphasize the addressee. Thus, i) if the character line in which a chief city name or country name is written matches the line in which a manually drawn line has been detected, that area is recognized as the addressee area. On the other hand, ii) if the line in which the underline has been detected is not correlated with or is different from the country name or chief city name, the object of the detected underline is not determined to emphasize the addressee. Further, the determining section rejects the determining process based on the underline information.

Now, a detailed description will be given of the process executed on a preprinted underline. Unlike manually drawn underlines, the preprinted underline is used to clarify the address described position. Thus, the preprinted underline is often present in the addressee area regardless of the address format. Accordingly, i) if a plurality of solid and dotted lines of a fixed length are detected in the area at fixed intervals, the area is recognized as the addressee area. Further, ii) if dotted and solid lines with the same inclination are present within the same line, that area is recognized as the addressee area. Furthermore, iii) if the plurality of preprinted lines detected are not regular; they do not have a fixed inclination or length, the determining section rejects the determining process based on the correlation with the address described position. Then, the determining section makes determination on the basis of the result of the comparison by the succeeding score comparing section for address recognition. Further, iv) if the detected solid lines are vertical lines in the lowermost and uppermost lines and at the head and end of the line, they are recognized as the remaining part of a window frame. That area is recognized as the addressee area.

As described above, the fourth determining technique can improve the accuracy of the addressee recognizing process by utilizing information on underlines contained in the addressee area.

As described above in detail, according to each embodiment, it is possible to improve the accuracy with which the sender area is recognized, providing accurate addressee recognition results.

For address recognition, it is essential to correctly detect the area in which the addressee is described. However, actual postal matter contains noise, an advertisement area, and the sender area, so that it is often difficult for the conventional technique to identify the addressee area. However, the present addressee recognizing apparatus provides a technique for determining the addressee area on the basis of a large number of aspects. Consequently, the present address recognizing apparatus can select the addressee area from a plurality of area candidates more correctly than the conventional technique. In particular, the sender area is very similar to the addressee area in, for example, the elements of the words constituting the area. This has troublesomely made it difficult to correctly select the addressee area. However, the above technique can reliably determine these two areas. Further, the above technique can be used to effectively remove parallel line noise that may directly affect address recognition results. The present invention adopts a technique for, even if the address cannot be accurately recognized, determining that the area is likely to be the addressee area. This prevents another area from being read and erroneously recognized.

As described above, the present invention can effectively prevent the sender area from being erroneously recognized as the addressee, thus providing accurate addressee recognition results.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An addressee recognizing apparatus for recognizing an addressee of matter to be delivered, comprising:

a storage unit which stores a description format including at least a position of a sender area on the matter to be delivered, the number of character rows in the sender area, the length of each character line, and the arrangement order of various words in the sender area;

a reading unit which reads an image from a surface of the matter to be delivered;

an extracting unit which extracts a plurality of candidates for an addressee area from the image read by the reading unit;

an addressee determining unit which determines the addressee by sequentially recognizing the candidates extracted by the extracting unit;

a determining unit which determines whether or not a description format for each of the candidates extracted by the extracting unit matches a description format for the sender area stored in the storage unit; and a prohibiting process unit which prohibits the candidate from being recognized as the addressee area if the determining unit determines that the description format for the candidate matches the description format for the sender area.

2. The addressee recognizing apparatus according to claim 1, wherein the determining unit makes the determination on the basis of arrangement of individual words constituting the description in the candidate.

3. The addressee recognizing apparatus according to claim 1, wherein information on the description format contains information indicative of a position of the sender area corresponding to a particular sender.

4. The addressee recognizing apparatus according to claim 1, wherein the information on the description format contains a word or a graphic which identifies the particular sender.

5. The addressee recognizing apparatus according to claim 1, further comprising a permitting process unit which permits, if the description in a candidate contains an underline, the candidate to be recognized as the addressee area.

6. The addressee recognizing apparatus according to claim 1, further comprising a permitting process unit which permits, if the description in a candidate contains a plurality of straight lines meeting predetermined conditions, the candidate to be recognized as the addressee area.

* * * * *